(12) United States Patent
Childers et al.

(10) Patent No.: US 11,020,900 B2
(45) Date of Patent: Jun. 1, 2021

(54) AUTOMATED THREE DIMENSIONAL PRINTING SYSTEM

(71) Applicant: 3D Systems, Inc., Rock Hill, SC (US)

(72) Inventors: Winthrop Childers, San Diego, CA (US); John Michael Harris, San Francisco, CA (US); Michael W. Munro, San Diego, CA (US)

(73) Assignee: 3D Systems, Inc., Rock Hill, SC (US)

( * ) Notice: Subject to any disclaimer, the term of this patent is extended or adjusted under 35 U.S.C. 154(b) by 363 days.

(21) Appl. No.: 16/191,666

(22) Filed: Nov. 15, 2018

(65) Prior Publication Data
US 2019/0152140 A1 May 23, 2019

Related U.S. Application Data

(60) Provisional application No. 62/587,545, filed on Nov. 17, 2017.

(51) Int. Cl.
| | | |
|---|---|---|
| *B29C 64/20* | (2017.01) | |
| *B29C 64/264* | (2017.01) | |
| *B29C 64/106* | (2017.01) | |
| *B33Y 10/00* | (2015.01) | |
| *B33Y 30/00* | (2015.01) | |
| *B33Y 40/00* | (2020.01) | |
| *B33Y 50/02* | (2015.01) | |

(52) U.S. Cl.
CPC ............ *B29C 64/20* (2017.08); *B29C 64/106* (2017.08); *B29C 64/264* (2017.08); *B29C 2791/001* (2013.01); *B33Y 10/00* (2014.12); *B33Y 30/00* (2014.12); *B33Y 40/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 10,048,916 B1* | 8/2018 | Polackal | ................. G06F 3/127 |
| 2008/0169586 A1 | 7/2008 | Hull et al. | |
| 2012/0195994 A1 | 8/2012 | El-Sibani et al. | |
| 2015/0375458 A1 | 12/2015 | Chen et al. | |
| 2017/0246808 A1 | 8/2017 | Hochsmann et al. | |
| 2017/0259507 A1 | 9/2017 | Hocker | |

FOREIGN PATENT DOCUMENTS

EP 0436760 7/1991

OTHER PUBLICATIONS

Rethink Production, Scale Your 3D Printing Operation with Formlabs, archive.org (retrieved Nov. 23, 2020). (Year: 2017).*

(Continued)

*Primary Examiner* — Matthew J Daniels
*Assistant Examiner* — Paul Spiel

(57) ABSTRACT

A three dimensional printing system includes a print engine, a storage system, and a controller. The controller is configured to (1) receive a build order defining a plurality of three dimensional articles to be manufactured, (2) allocate partitions for receiving the plurality of the three dimensional articles within the storage system, (3) operate the print engine to fabricate the three dimensional articles, and (4) transfer the three dimensional articles to the partitions as they are built.

15 Claims, 16 Drawing Sheets

(56) References Cited

OTHER PUBLICATIONS

PCT International Search Report the International Searching Authority for PCT/US2018/061200, dated Mar. 4, 2019 (5 pages).
PCT Written Opinion of the International Searching Authority for PCT/US2018/061200, dated Mar. 4, 2019 (8 pages).
Rethink Production, Scale Your 3D Printing Operation with Formlabs. Datasheet [online]. Formlabs, Inc. 2018 [retrieved on Nov. 15, 2018]. Retrieved from <https://formlabs.com/3d-printers/form-cell/>.
Formlabs introduces Form Cell, production automation for stereolithography (SLA) 3D printing, powered by the Form 2. YouTube [online] [video]. [retreived on Nov. 15, 2018] Retrieved from <https://www.youtube.com/watch?v=LvOdZ6FC-1E>.

* cited by examiner

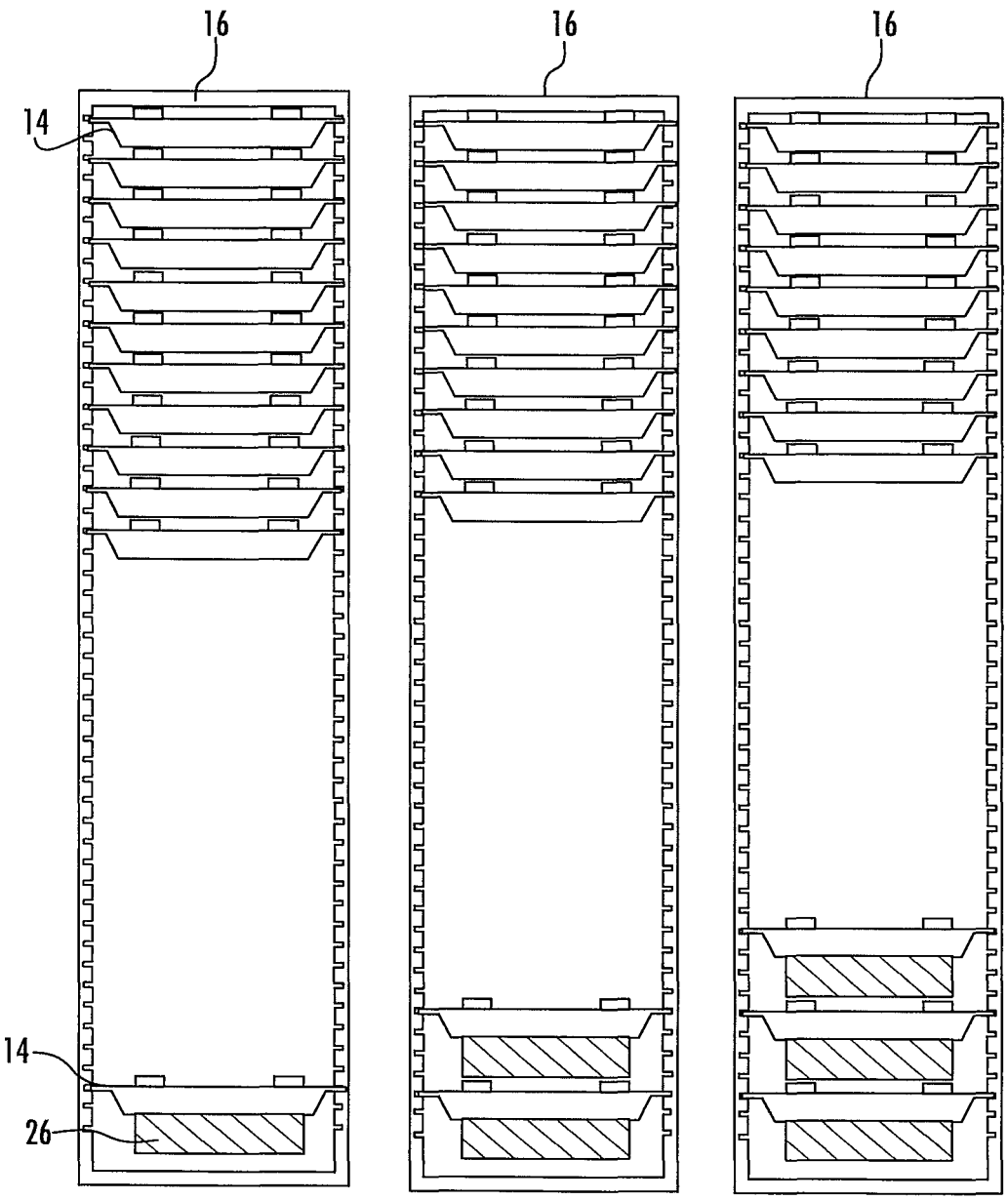

MOVEMENT SEQUENCE:

C1 IS FULL AND C2 IS EMPTY
C2 IN +Y DIRECTION (TO REAR)
C1 IN +X DIRECTION (FOR REMOVAL AND REPLACEMENT WITH EMPTY CONTAINER).
C2 IN -X DIRECTION
C2 IN -Y DIRECTION (TO OPERATING POSITION)

AUTOMATED THREE DIMENSIONAL PRINTING SYSTEM

This non-provisional patent application claims priority to U.S. Provisional Application Ser. No. 62/587,545, Entitled "AUTOMATED THREE DIMENSIONAL PRINTING SYSTEM" by Winthrop Childers et al., filed on Nov. 17, 2017, incorporated herein by reference under the benefit of 35 U.S.C. 119(e).

FIELD OF THE INVENTION

Field of the Invention

The present disclosure concerns a three dimensional printing system for the digital fabrication of three dimensional articles. More particularly, the present disclosure concerns a compact three dimensional printing system that enables an automated completion of a build order that includes a plurality of three dimensional articles of manufacture.

Background

Three dimensional (3D) printers are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support surface, and a controllable light engine. The stereolithography system forms a three dimensional (3D) article of manufacture by selectively curing layers of the photocurable resin. Each selectively cured layer is formed at a "build plane" within the resin.

There is an ongoing desire to utilize three dimensional printers for high value and/or customized manufacturing. One challenge has been the cost of labor intervention required to operate three dimensional printers. There is an ongoing need to improve the productivity of both labor and equipment used for three dimensional printing.

BRIEF DESCRIPTION OF THE FIGURES

FIG. 9C is an illustration of a container 16 with eleven empty build trays and one full build tray.

FIG. 9D is an illustration of a container 16 with ten empty build trays and two full build trays.

FIG. 9E is an illustration of a container 16 with nine empty build trays and three full build trays.

SUMMARY

Figure 1:
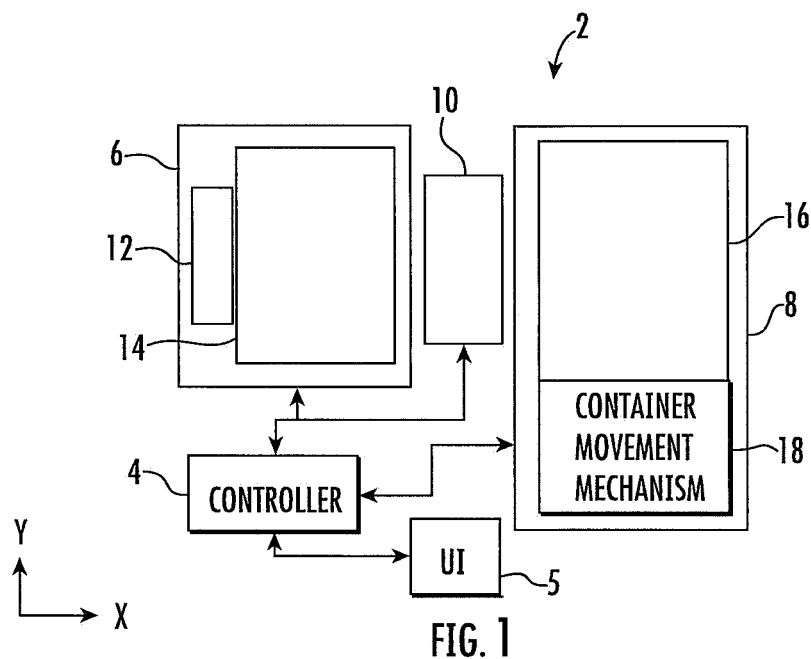
FIG. 1 is a schematic diagram of a first embodiment of a three dimensional printing system.

In a first aspect of the disclosure, a three dimensional printing system includes a print engine, a storage system, and a controller. The controller is configured to (1) receive a build order defining a plurality of three dimensional articles to be manufactured, (2) allocate partitions within the storage system for receiving the plurality of the three dimensional articles, (3) operate the print engine to fabricate the three dimensional articles, and (4) transfer the three dimensional articles to the partitions as they are built.

An "empty" support tray is one that does not yet have an attached three dimensional article. A "full" support tray has an attached three dimensional article.

In one implementation the print engine includes a resin vessel having a lower side with a transparent sheet, a light engine that defines a build plane above the transparent sheet, and a carriage having support arms for supporting a support tray. To fabricate a three dimensional article the controller is configured to (a) move the carriage until a lower face of the support tray (or hardened resin) is proximate to the build plane, (b) operate the light engine to selectively cure resin onto the lower face, and (c) repeat (a) and (b) until the three dimensional article is fully fabricated.

In another implementation the three dimensional printing system includes a pick and place mechanism. The print engine includes a carriage having support arms for supporting a support tray. The controller is configured to separately position the support arms and/or a partition of the storage system into alignment with the pick and place mechanism in order to transfer a support tray between the support arms and the partition.

In yet another implementation the storage system includes a container having a vertical array of slots. A slot is capable of receiving an upper portion of a support tray. The allocated partitions are vertically arranged or stacked portions of the container with a partition including part or all of one or more slots.

In a further implementation the storage system includes a rotatable container that can be rotated about a vertical Z-axis. This rotation allows support trays to be loaded or unloaded from different sides of the container.

In a yet further implementation the storage system includes two or more containers. Support trays can be loaded and/or unloaded from the two or more containers.

In another implementation the controller is configured to transfer empty support trays from the storage system to the print engine.

In yet another implementation the controller is configured to provide instructions to a user for loading a plurality of support trays into the storage system after step (2) but before step (3).

In a further implementation the controller allocates partitions of the storage system for empty support trays. The partitions holding empty support trays overlap the partitions for holding full support trays because the empty support trays are removed from the areas of overlap before the full support trays are inserted into the areas of overlap to avoid interference between empty and full support trays.

In a yet further implementation the storage system is adapted to hold full support trays with manufactured articles during one or more of a cleaning process, a rinsing process, a light curing process, an inspection process, and other processes. The controller is configured to operate portions of the three dimensional printing system to provide any or all of these processes.

In a second aspect of the invention a three dimensional printing system includes a print engine, a storage system, a pick and place mechanism, and a controller. The print engine includes: a resin vessel having a lower side with a transparent sheet, a light engine that defines a build plane above the transparent sheet; a carriage having support arms for supporting a support tray; and a support movement mechanism coupled to the carriage. The storage system includes at least one container with a vertical arrangement of slots a container movement mechanism. The controller is configured to (1) receive a build order defining a plurality of three dimensional articles to be fabricated, (2) allocate partitions of the at least one container for the three dimensional articles, (3) vertically position the support arms and a slot holding an empty support tray to within a vertical capture distance of the pick and place mechanism, (4) operate the pick and place mechanism to transfer the empty support tray from the slot to the support arms, (5) operate the print engine to fabricate one of the three dimensional articles onto the support tray, (6) vertically position the support arms and an empty one of the partitions to within a vertical capture distance of the pick and place mechanism, (7) operate the pick and place mechanism to transfer the support tray with the fabricated three dimensional article from the support arms to the empty partition, and repeat steps 3-7 to complete the build order. An "empty" support tray is one that does not yet have an attached three dimensional article. A "full" support tray has an attached three dimensional article.

In one implementation the controller is configured to send instructions to a user for loading the empty support trays between steps (2) and (3). The instructions are sent to a user interface displayed upon a device used by the user, the device being one of a display that is integral to the three dimensional printing system and a client device. The client device is one of a laptop computer, a tablet computer, a smartphone, and a mobile wireless device.

In another implementation the empty support trays occupy a range that overlaps with the allocated partitions before step (4).

DETAILED DESCRIPTION OF THE PREFERRED EMBODIMENTS

FIG. 1 is a schematic diagram of a first embodiment of a three dimensional printing system 2. The three dimensional printing system 2 includes a controller 4 coupled to a modular print engine 6, a storage system 8, and a pick and place mechanism 10. In discussing printing system 2, mutually perpendicular Cartesian axes X, Y, and Z will be used. Axes X and Y are lateral axes, and are approximately horizontal. Axis Z is a vertical axis and is approximately aligned with a gravitational reference.

Controller 4 includes a processor (not shown) coupled to an information storage device (not shown). The information storage device includes a non-volatile or non-transient information storage device storing software instructions, that when executed on the processor, operate the modular print engine 6 and the storage system 8. Controller 4 and its components can be located in one or more locations in the three dimensional printing system 2.

The print engine 6 includes various components including a vertical support structure 12 and a support tray 14. Support tray 14 is for supporting a three dimensional article of manufacture being formed in the print engine 6.

The storage system 8 is configured to store "empty" support trays 14 and "full" support trays 14 having attached three dimensional articles of manufacture. In one embodiment, the storage system includes a container 16 and a container movement mechanism 18. Container movement mechanism 18 is for facilitating the loading and unloading of support trays 14 to and from the container 16.

The pick and place mechanism 10 is configured to transfer empty support trays 14 from the storage system 8 to the print engine 6 and to transfer full support trays 14 from the print engine 6 to the storage system 8. In some embodiments, the pick and place mechanism 10 has a limited "vertical capture distance." With such an embodiment a motion of the support tray 14 between the print engine 6 and storage system 8 has a predominantly lateral component and a vertical component to a lesser extent.

In one embodiment, the pick and place mechanism 10 includes: (1) a motorized belt to provide a lateral translation along X, (2) a motorized cam that opposes a spring to provide vertical motion, and (3) an electromagnet for securing the support tray 14 during transport and for lifting the support tray from the print engine 6. In another embodiment, the vertical motion can be provided by a solenoid. Other variants are possible.

As stated before, controller 4 is configured to operate all portions of the three dimensional printing system 2. Controller 4 is also configured to interact with a user through a device 5 user interface (UI). Device 5 can be a touchscreen integrated into the three dimensional printing system 2 hardware. Alternatively device 5 can be a client device 5 that is coupled to the controller 4 through a network and/or wireless link. Such a client device can be a laptop computer, a tablet computer, a smartphone, or any mobile or fixed device.

In one embodiment, the controller 4 is configured to receive a build order package from device 5 or another source. The build order package defines a build plan or a plurality of three dimensional articles of manufacture to be fabricated by the three dimensional printing system 2. The controller 4 is configured to analyze the build order package and estimate an amount of storage capacity within storage system 8 for accommodating the build order package. The controller is also configured to analyze the build order and to define partitions within container 16 for receiving and storing support trays with their attached three dimensional articles of manufacture. The controller is configured to display instructions on the device 5 UI instructing the user for loading an appropriate number of support trays 14 into the container 16. These instructions can be based partly upon the capacity analysis and partitioning. The controller 4 is configured to receive an input through the device 5 UI that begins an automated execution of the build plan. The controller 4 is configured to then operate components of the three dimensional printing system 2 to complete the build plan.

Figure 2:
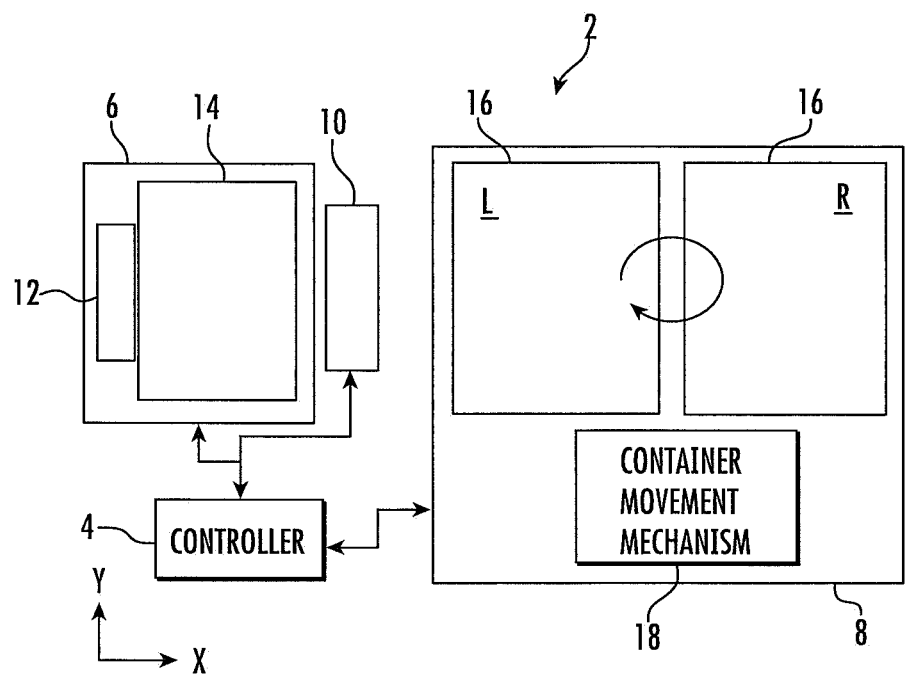
FIG. 2 is a schematic diagram of a second embodiment of a three dimensional printing system.

FIG. 2 is a schematic diagram of a second embodiment of a three dimensional printing system 2. The depicted second embodiment is similar to the first embodiment except for the design of the storage system 8. Storage system 8 includes two containers 16 to provide added storage capacity and enable printing system 2 to handle larger build orders. The pick and place mechanism 10 is able to access the container to the left (L in the figure). When access to the container on the right (R in the figure) is desired, container movement mechanism 18 rotates the two containers about a vertical axis (Z) by 180 degrees. In one embodiment, the two containers 16 are mounted on a rotatable carousel which is part of the movement mechanism 18. In some embodiments, the carousel can hold three, four, or any number N of containers. For N containers the carousel can move in increments of 360 degrees divided by N in order to switch between containers accessible by the pick and place mechanism 10.

The printing system 2 can include a housing that absorbs light that would otherwise cure the resin. This will prevent uncured resin residue from curing onto articles manufactured by the system 2 before they are unloaded by a user. The housing can be opaque, yellow, orange, red, or any color that screens out light wavelengths that would otherwise cure the resin.

Figure 3:
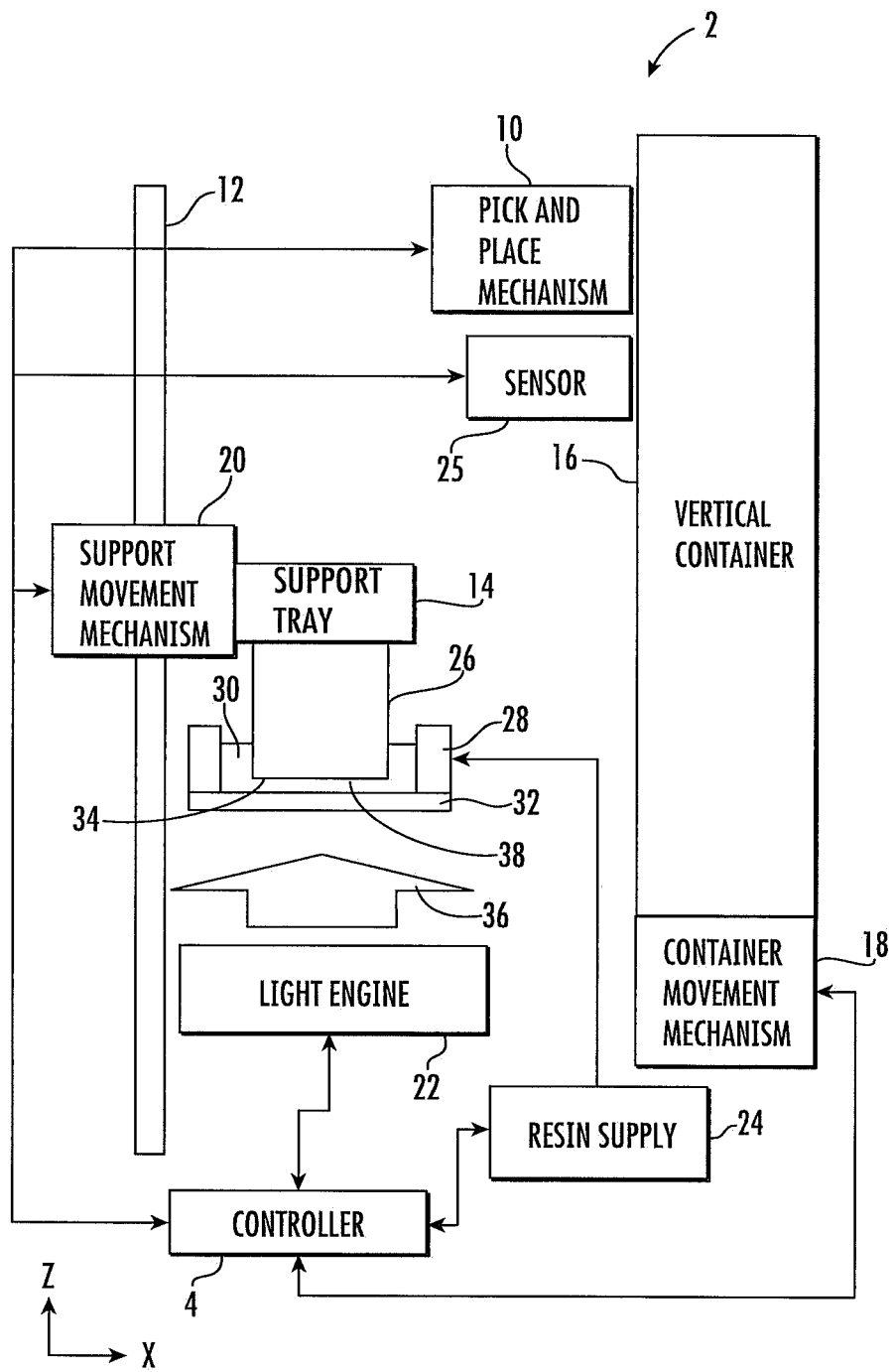
FIG. 3 is a schematic side view of an embodiment of a three dimensional printing system.

FIG. 3 is a side view of an embodiment of the three dimensional printing system 2. Controller 4 is controllably coupled to pick and place mechanism 10, container movement mechanism 18, support movement mechanism 20, light engine 22, resin supply 24, and sensor 25.

In the illustrated embodiment, the container 16 has a vertical arrangement of bays or slots (shown in later figures) for receiving and holding a plurality of support trays 14. The container movement mechanism 18 is configured to vertically position (along Z) the container 16 to facilitate transferring a support tray 14 to or from a particular bay or slot.

The support movement mechanism 20 is configured to vertically position support tray 14 for three dimensional printing or for transferring a support tray 14 between the print module 6 and the vertical container 16. In the illustrated embodiment, the support tray 14 is supporting an attached three dimensional article of manufacture 26. A resin vessel 28 contains resin 30 and a transparent sheet 32 at a lower end. The three dimensional article of manufacture 26 has a lower face 34 that immersed in the resin 30 and in facing relation with the transparent sheet 32.

The light engine 22 is configured to project pixelated light 36 up through the transparent sheet 32 and to a build plane 38 within the resin 30. Build plane 38 is vertically proximate to the lower face 34 and defines a lateral extent (in X and Y) of the light engine 22 for curing layers of the resin 30. Resin supply 24 is configured to maintain a sufficient level of resin 30 in resin vessel 28.

The sensor 25 can include an emitter and detector pair. The emitter projects a light beam through the vertical container to verify presence of a support tray 14 and/or a three dimensional article of manufacture 26. The container movement mechanism can move container 16 up and down to allow the sensor to inspect various portions or vertical partitions of the container 16. If the controller 4 detects a misplaced or missing empty support tray 14, then the controller 4 can send instructions to the UI for correcting the situation. If the controller detects a missing three dimensional article of manufacture 26 then the controller 4 can send an alert to the user along with instructions for correcting a problem that may have occurred.

Figure 4A:
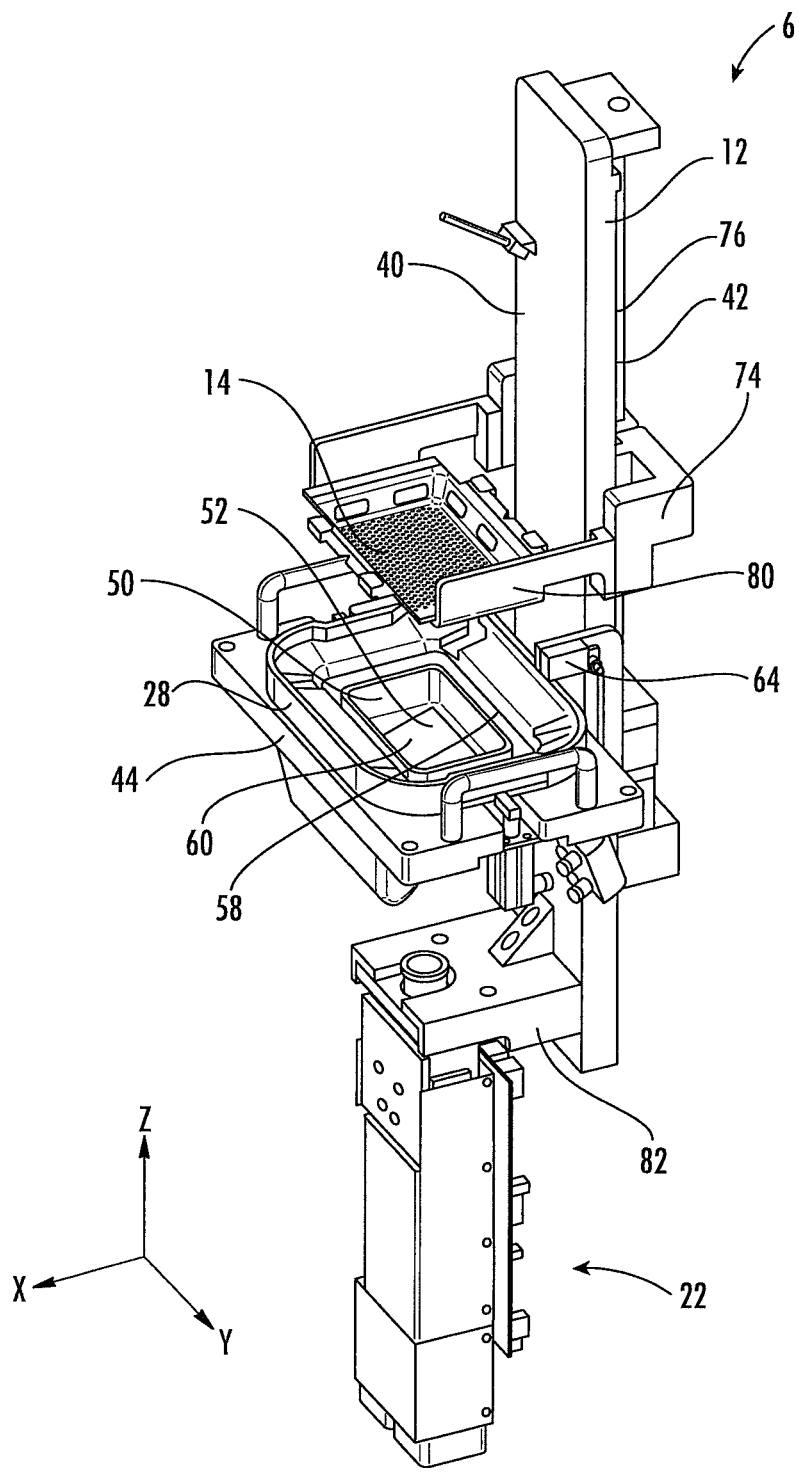
FIG. 4A an isometric view of an embodiment of a print engine.
Figure 4B:
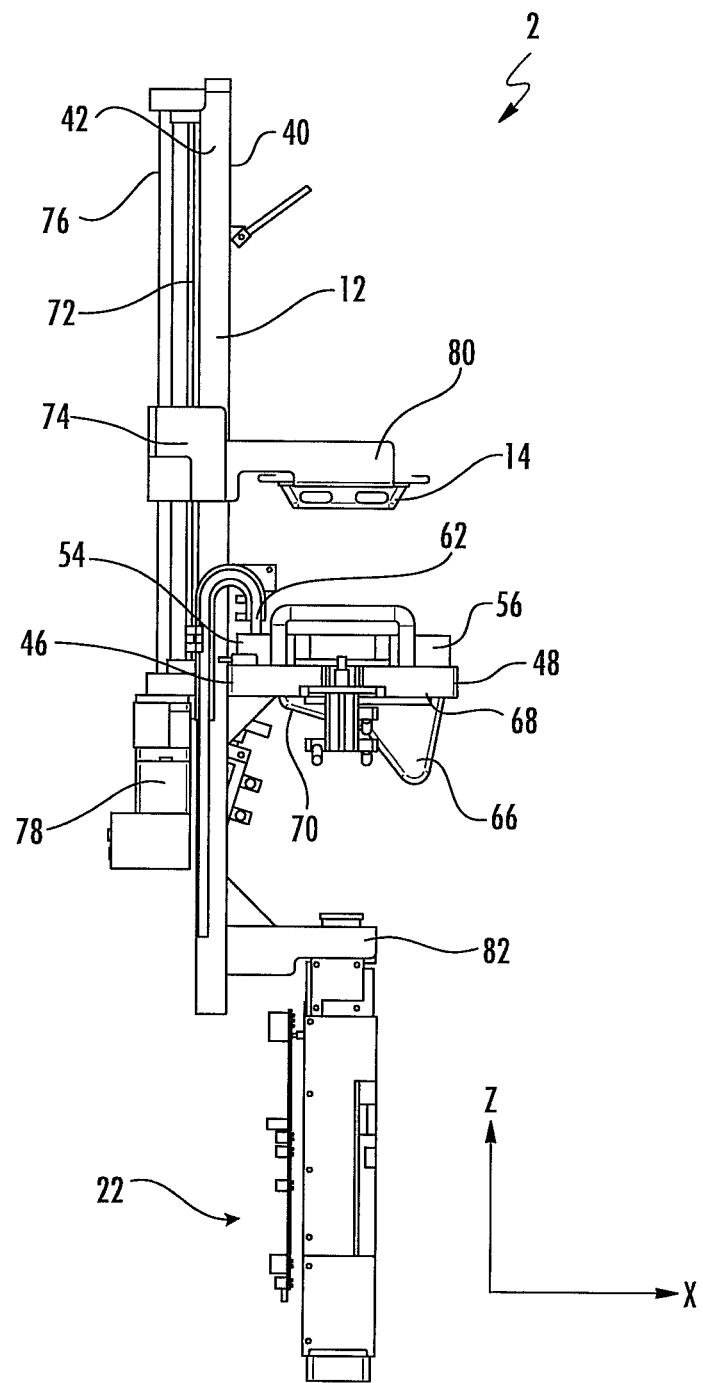
FIG. 4B is a side view of an embodiment of a print engine.

FIG. 4A is an isometric view and FIG. 4B is a side view of an embodiment of the print engine 6. Print engine 6 includes a vertical support 12 having a front side 40 and a back side 42. Vertical support 12 generally provides a "vertical backbone" from which other components of print engine 6 are mounted.

A support plate 44 is mounted to the vertical support 12. Support plate 44 has a proximal end 46 that is proximate to the front side 40 of vertical support 12. Support plate 44 extends from proximal end 46 to distal end 48 along the lateral axis X. Support plate 44 has an inner surface 50 facing inwardly and defining a central opening 52.

The resin vessel 28 is supported by the support plate 44. The resin vessel 28 has a rear portion 54 that is proximate to the proximal end 46 of the support plate 44. The resin vessel 28 has a front portion 56 that is proximate to the distal end 48 of the support plate 44. Resin vessel 28 has an inner edge 58 that surrounds a central opening 60. The central openings 52 and 60 are laterally aligned with respect to each other to enable an optical path for vertically projected pixelated light. Central opening 60 is laterally contained within central opening 52.

A resin fluid outlet 62 is positioned over the rear portion 54 of resin vessel 28. A fluid level sensor 64 is positioned over the rear portion 54 of the resin vessel 28. The resin fluid outlet 62 and fluid level sensor 64 are separated from each other along the lateral axis Y. The resin supply 24 is coupled to the resin fluid outlet 62.

A fluid spill containment vessel 66 is releasably mounted to a lower side 68 of the support plate 44. Fluid spill containment vessel 66 is for capturing any resin spills resulting from damage to or overfilling of the resin vessel 28. The fluid spill containment vessel 66 includes a window 70. The window 70 is laterally aligned with the central openings 52 and 60 to enable the aforementioned optical path for vertically projected pixelated light.

Mounted to the rear side 42 of vertical support 12 is a vertical track 72. A carriage 74 is mounted in sliding engagement with the vertical track 72. A motorized lead screw 76 is configured to drive the carriage 74 along vertical axis Z. The lead screw 76 is coupled to motor system 78 which rotates the lead screw 76 to drive the carriage 74 vertically along the vertical track 72. The carriage includes a pair of support arms 80 extending from the carriage 74 along the lateral axis X. Supported between the support arms 80 is the support tray 14.

In comparing FIGS. 3, 4A, and 4B, the support movement mechanism 20 of FIG. 3 includes the vertical track 72, the carriage 74, the lead screw 76, and the motor system 78. Motor system 78 is under control of controller 4 to rotate the lead screw 76 and to thereby vertically translate the carriage 74 along the vertical track 72.

The light engine 22 is mounted to the vertical support 12 via a support bracket 82. Support bracket 82 extends away from the front side 40 of vertical support 12 along lateral axis X. Pixelated light from light engine 22 is projected vertically upwardly. The pixelated light passes through the fluid spill containment vessel 66, the support plate 44, and the resin vessel 28 to the build plane 38 within the resin vessel 28.

Figure 5A:
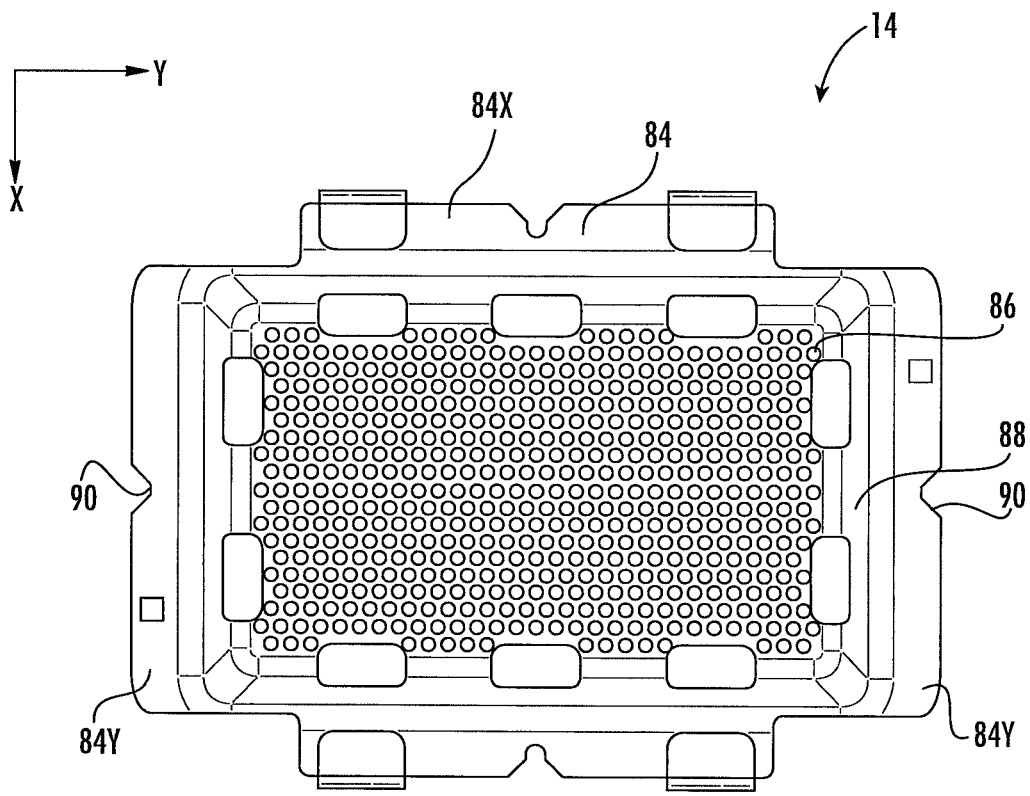
FIG. 5A is a top view of a support tray.
Figure 5B:
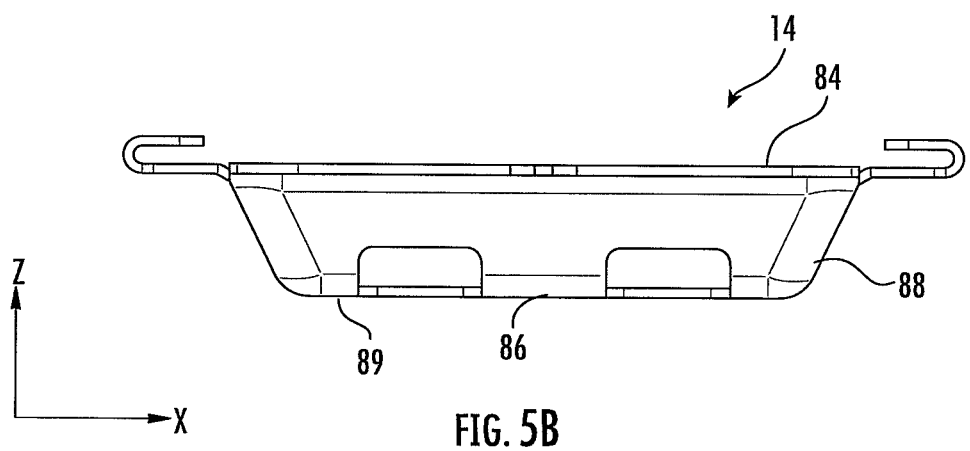
FIG. 5B is a side view of a support tray.

FIGS. 5A and 5B are top and side views of the support tray 14. Support tray 14 includes an upper portion 84, a lower planar portion 86, and a side wall 88 coupling the upper portion 84 to the lower planar portion 86. The lower planar portion 86 has a lower face 89 upon which the three dimensional article of manufacture 26 is to be formed.

The upper portion 84 includes portions 84X that extend along the lateral X axis and portions 84Y that extend along the lateral Y axis. The portions 84Y are for supporting the support fixture 14 between the support arms 80. Each 84Y portion includes a datum feature 90 for receiving and aligning to pins 92 (see FIG. 6) that extend upwardly from the support arms 80. The portions 84Y are also made of a magnetic material that is held down by magnets embedded in support arms 80. In an illustrative embodiment the entire support fixture 14 is formed from a magnetic material. When the support fixture 14 is being raised, the support arms 80 provide support in an upper direction because the support arms 80 press upwardly on the portions 84Y. When the support fixture is lowered whereby lower planar portion 86 is passing into resin 30, the magnetic interaction between the upper portion 84 and the support arms 80 provides a downward force that secures the support fixture 14 to the support arms 80.

Figure 6:
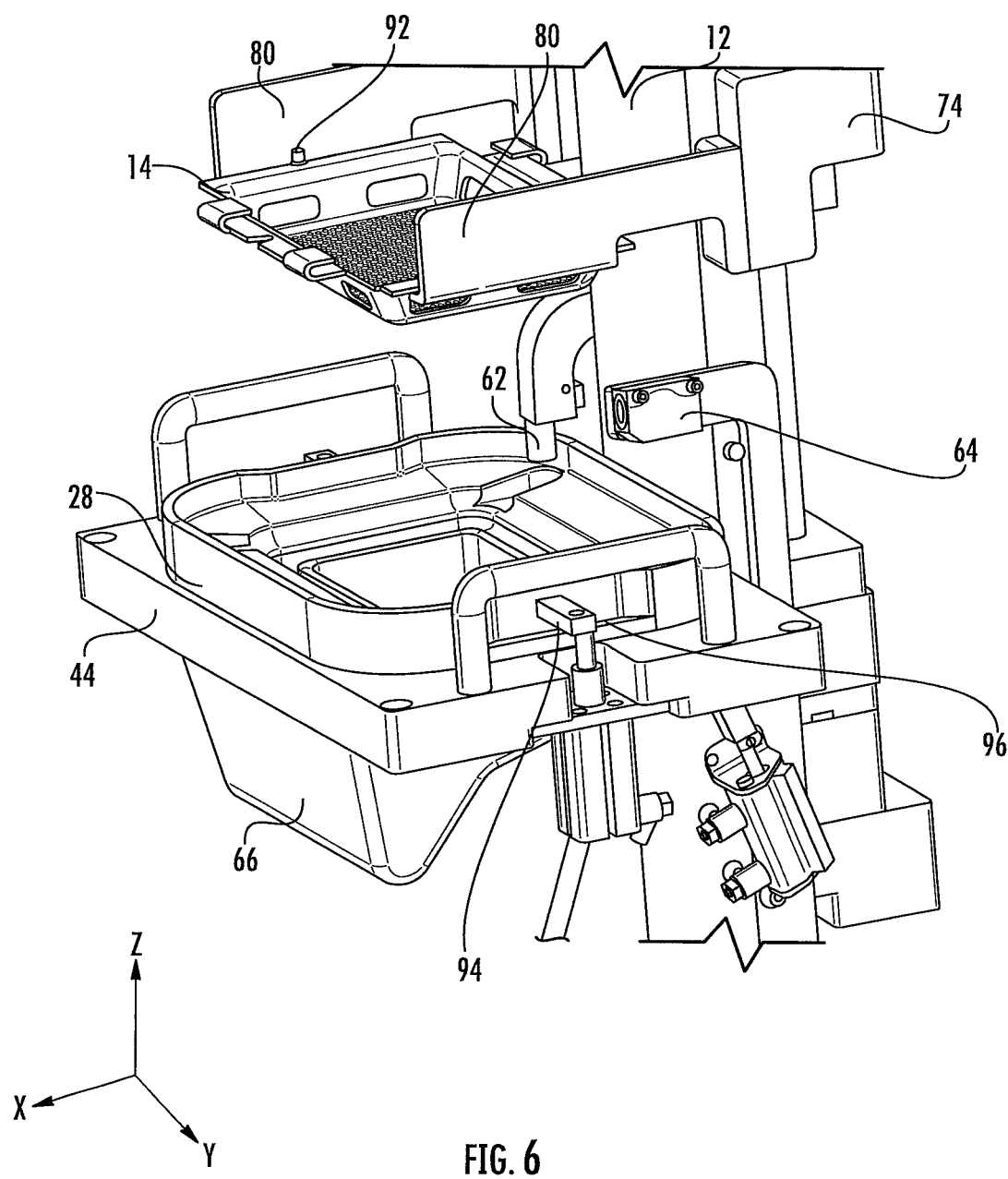
FIG. 6 is an isometric view of a portion of a print engine.

FIG. 6 depicts a more detailed view of a portion of the print engine 6. Element numbers shown are consistent with those discussed with respect to earlier figures. As depicted, the resin vessel 28 and the fluid spill containment vessel 66 are both loaded onto the support plate 44. Also shown is a latch 94 that engages a latch feature 96 formed into and end of resin vessel 28. The resin vessel includes two such latch features 96 at opposing ends with respect to Y which are engaged by opposing latches 94.

Carriage 74 is slidingly coupled to vertical support 12. Carriage 74 moves along vertical axis Z. Carriage 74 includes two support arms 80 that extend from a proximal end proximate to the vertical support 12 to a distal end along X. The support arms 80 include upwardly extending pins 92 that engage datum features 90 for laterally aligning the support tray 14 to the print engine 6. The support tray 14 is vertically aligned through engagement with the support arms 80.

Figure 7:
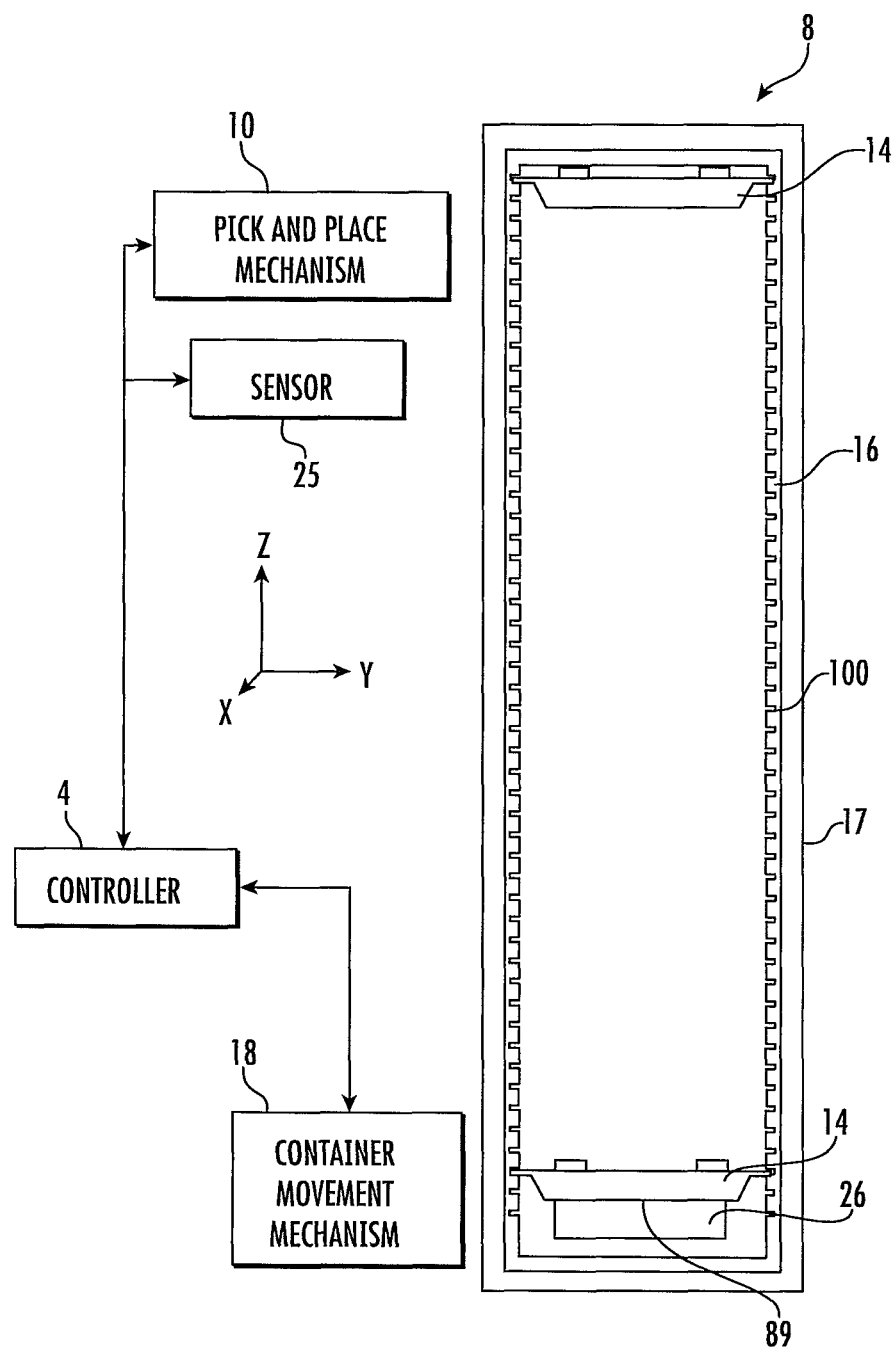
FIG. 7 is a schematic view of an embodiment of a storage system.

FIG. 7 is a schematic illustration of an embodiment of storage system 8 having a single container 16. The illustrated container 16 has a vertical array of slots 100 arranged along axis Z. The slots 100 are on opposing sides of the container 16 for receiving the portions 84Y of the upper portion 84 of the support tray 14. An "empty" support tray 14 is depicted in the upper slots 100 of container 16—empty means that the lower face 89 of the support tray 14 does not yet have an attached three dimensional article of manufacture 26. The third slots 100 from the bottom of container 16 support a "full" support tray 14 with a three dimensional article of manufacture 26 attached to its lower face 89.

A container movement mechanism 18 is configured to impart up and down vertical motion to the container 16 under control of controller 4. In one particular embodiment, the container movement mechanism 18 can include a motorized round or cylindrical gear that engages a linear vertical gear that forms part of container 16—i.e., the vertical motion can be based upon a rack and pinion system. In an exemplary embodiment, a housing 17 carries the container 16. The container is loaded into the housing 17. In yet another embodiments, the vertical motion can be driven by a vertical lead screw in a manner similar to that of carriage 74. While only one housing 17 and container 16 is illustrated, it is to be understood that storage system 8 can include one or more housings 17 with two or more containers 16 as illustrated with respect to FIGS. 2, 12, and 13.

When an empty or full support tray 14 is to be loaded or unloaded from container 16, the container movement mechanism will move the occupied slot 100 (occupied or to be occupied by portions 84Y of the support tray) to within a "vertical capture distance" of the pick and place mechanism 10. The "vertical capture distance" can be defined by limits of vertical motion of the pick and place mechanism 10. Then the transfer (load or unload) can take place.

In the illustrated embodiment, the vertical pitch of the slots 100 is about 15 millimeters. A single slot has a vertical width of about 2 millimeters but a 4 millimeter "lead-in" which is an angled tapering entrance to facilitate loading the support trays 14. One container 16 has 50 slots and the overall height of the container is about 780 millimeters. Of course this is just an example and these parameters can vary. The slots 100 can have a different vertical pitch such as 10 millimeters or more than 15 millimeters. Having a higher density of slots 100 (i.e., a smaller pitch) can improve the vertical packing efficiency of the filled support trays but there are practical limits.

Figure 8:
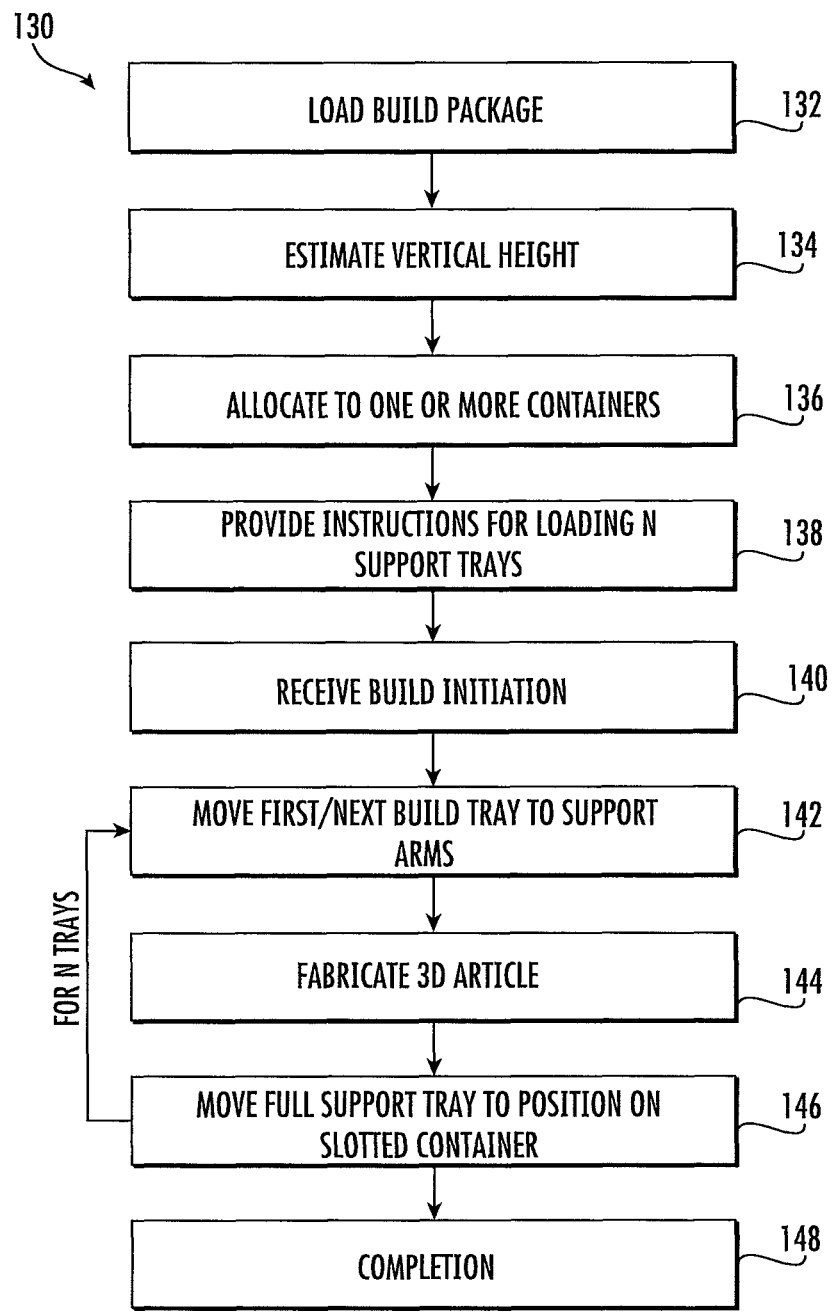
FIG. 8 is a flowchart depicting a method of manufacturing a plurality of three dimensional articles of manufacture.

FIG. 8 is a flowchart depicting a method 130 of manufacturing a plurality or three dimensional articles of manufacture 26 using the three dimensional printing system 2. This method 130 is performed under control of controller 4. The method is illustrated by the following FIGS. 9A-E. As part of method 130, a user receives instructions upon a device 5 UI.

Figure 9A:
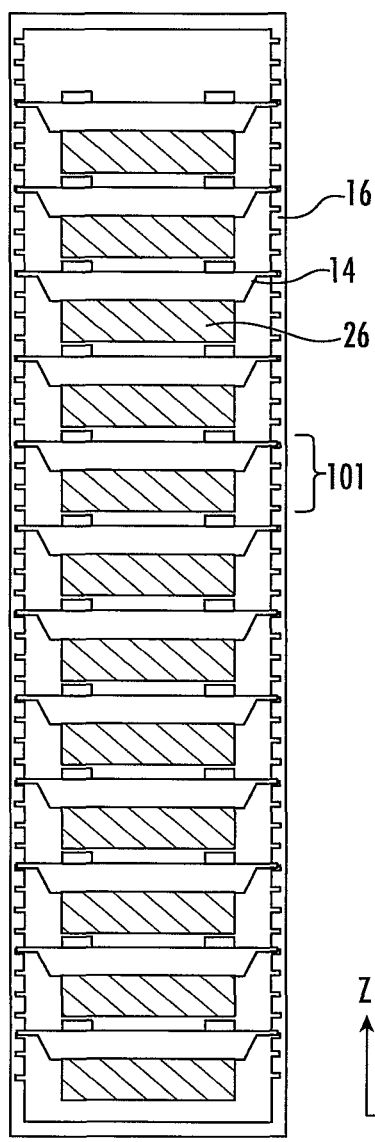
FIG. 9A is an illustration of a container 16 containing full support trays pursuant to a completed build plan.

According to step 132, a build package (i.e., file or set of files) is loaded into the controller 4. The build package defines a "build plan" for the manufacture of the three dimensional articles of manufacture 26. According to step 134, a vertical height is estimated for the three dimensional articles of manufacture 26. The vertical height is based upon a number and size of partitions 101 required for the build plan. The partitions can vary in size. FIG. 9A depicts 12 partitions of equal size. On the other hand, FIG. 10A depicts 9 partitions for the same container 16 but with some variation in partition height.

Figures 10A, 10B:
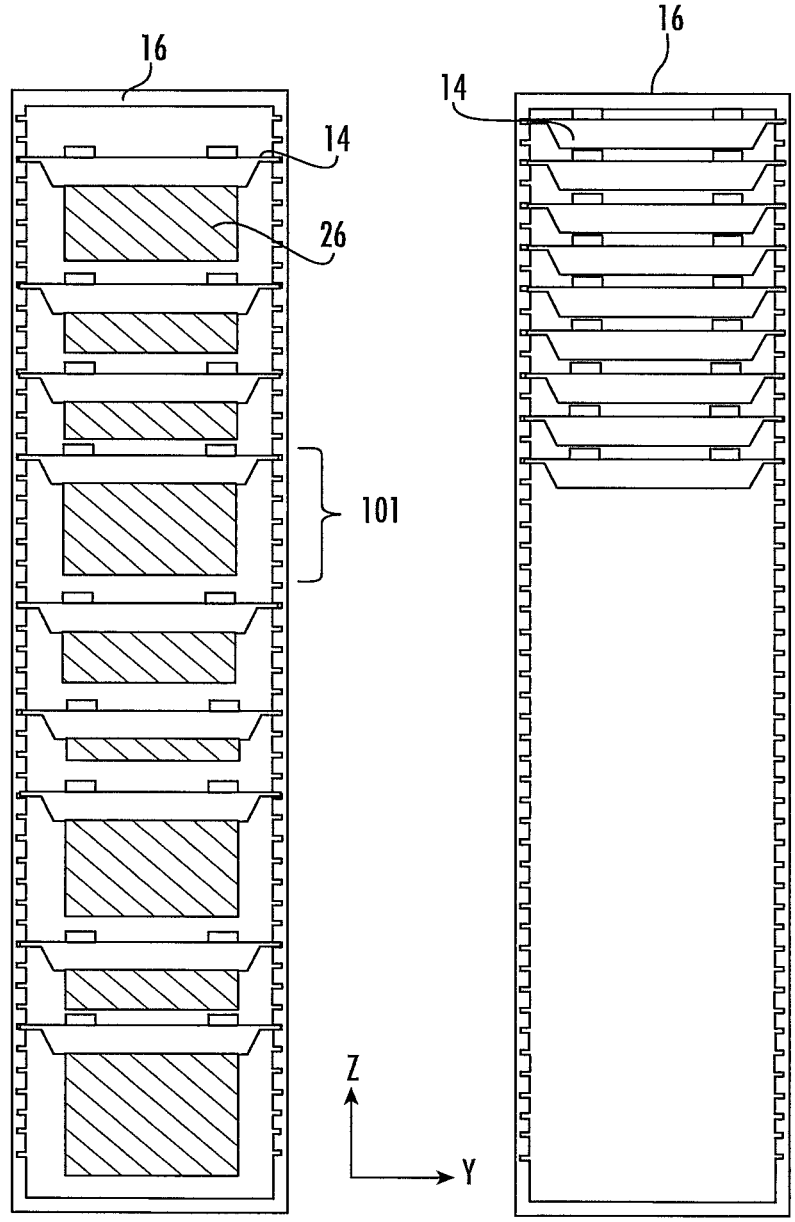
FIG. 10A is an illustration of a container 16 with nine full build trays requiring differently sized partitions.
FIG. 10B is an illustration of a container 16 with nine empty build trays.

FIGS. 9A and 10A illustrate partitions 101 as vertically defined partitions 101. Each partition defines a vertical range in Z and contains and/or intersects some number of slots 100 depending upon a vertical extension of the three dimensional article of manufacture 26 from lower face 89 and a location within the container 16.

Other embodiments of container 16 can have different partition designs 101. For example, an alternative embodiment of container 16 can accommodate a two dimensional rectangular array of partitions 101. Yet another embodiment can be a cylindrical container 16 that has partitions 101 defined over a cylindrical surface.

According to step 136, the build plan is allocated to one or more containers 16. As part of step 136, it is possible that the storage system 8 does not have a sufficient capacity to for the entire build plan. Then a user can receive a message from controller 4 with instructions for dividing up the build plan along with time estimates. For purposes of illustration it is assumed that FIG. 9A represents a build plan for one container. FIG. 9A also depicts the completion of method 130.

Figure 9B:
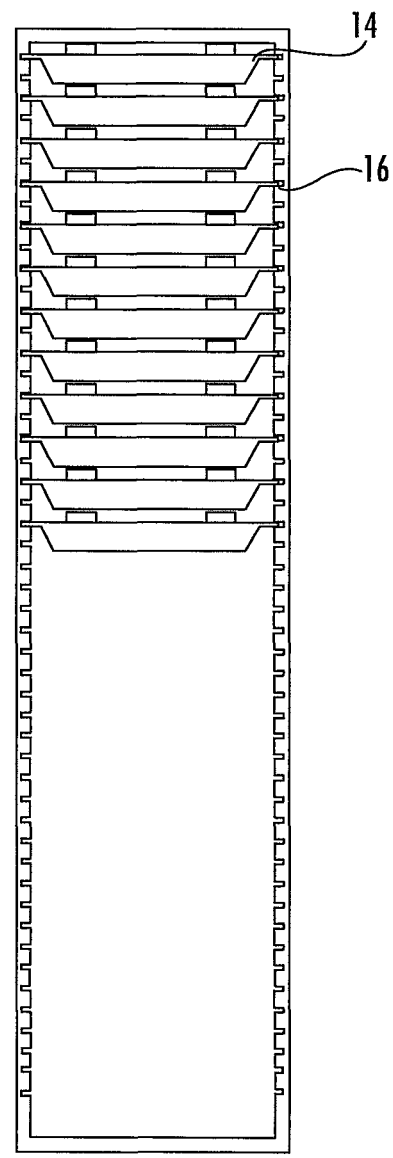
FIG. 9B is an illustration of a container 16 containing empty support trays.

According to step 138, the user receives instructions on device 5 UI for loading a plurality N of support trays 14 into the container 16. This is depicted in FIG. 9B. According to the illustrated embodiment in FIG. 9B, the user then loads 12 support trays into the container 16. After the support trays are loaded, the user starts automated production according to step 140.

According to step 140 the controller receives an input from the device 5 to start the automated build process. According to step 142, a build tray 14 is transferred to support arms 80. According to step 144, a three dimensional article 26 is fabricated onto the lower surface 89 of build tray 14. According to step 146, the filled build tray 14 (filled defined has having a three dimensional article of manufacture 26 attached thereto) is moved to an allocated partition on the slotted container 16. Steps 142 to 146 are illustrated in FIG. 9C for one tray. As can be seen, a tray 14 was removed from the bottom of the empty tray stack in step 142 and then replaced at the bottom of the container in step 146.

Steps 142 to 146 are executed N times according to the initial build plan. FIG. 9C depicts the result after one empty tray has been processed. FIG. 9D depicts the result after two empty trays have been processed. FIG. 9E depicts the result after three empty trays have been processed. FIG. 9A depicts the results after N=12 empty trays have been processed which is the complete build plan. According to step 148, the method 130 is completed. As part of step 146 and/or step 148, the controller 4 can utilize the sensor 25 to verify that the fabricated 3D articles are present in the container 16. The controller 4 can also use sensor 25 to estimate whether a three dimensional article of manufacture 26 is partially or fully fabricated. If not, then the controller 4 can halt operation of the printing system 2 send a message to a user of the printing system 2 alerting a user that the printing operation has malfunctioned. The message can be transmitted to a user's mobile or fixed computer device.

In some embodiments, the user may receive instructions for loading more empty trays 14 between steps 146 and 148 when the build plan exceeds the capacity of the storage system 8. Then the process continues with step 140.

In other embodiments, the user may unload one or more containers 16 with full support trays 14 and load one or more containers with empty support trays 14 as part of the method 130.

FIG. 10A illustrates a build plan and build completion when N=9 and there are unequal vertical dimensions of the three dimensional articles of manufacture 26. Thus, the allocated partitions 101 are also unequal in vertical height. FIG. 10B illustrates the loaded build trays 14 according to the instructions of step 138.

Figure 11:
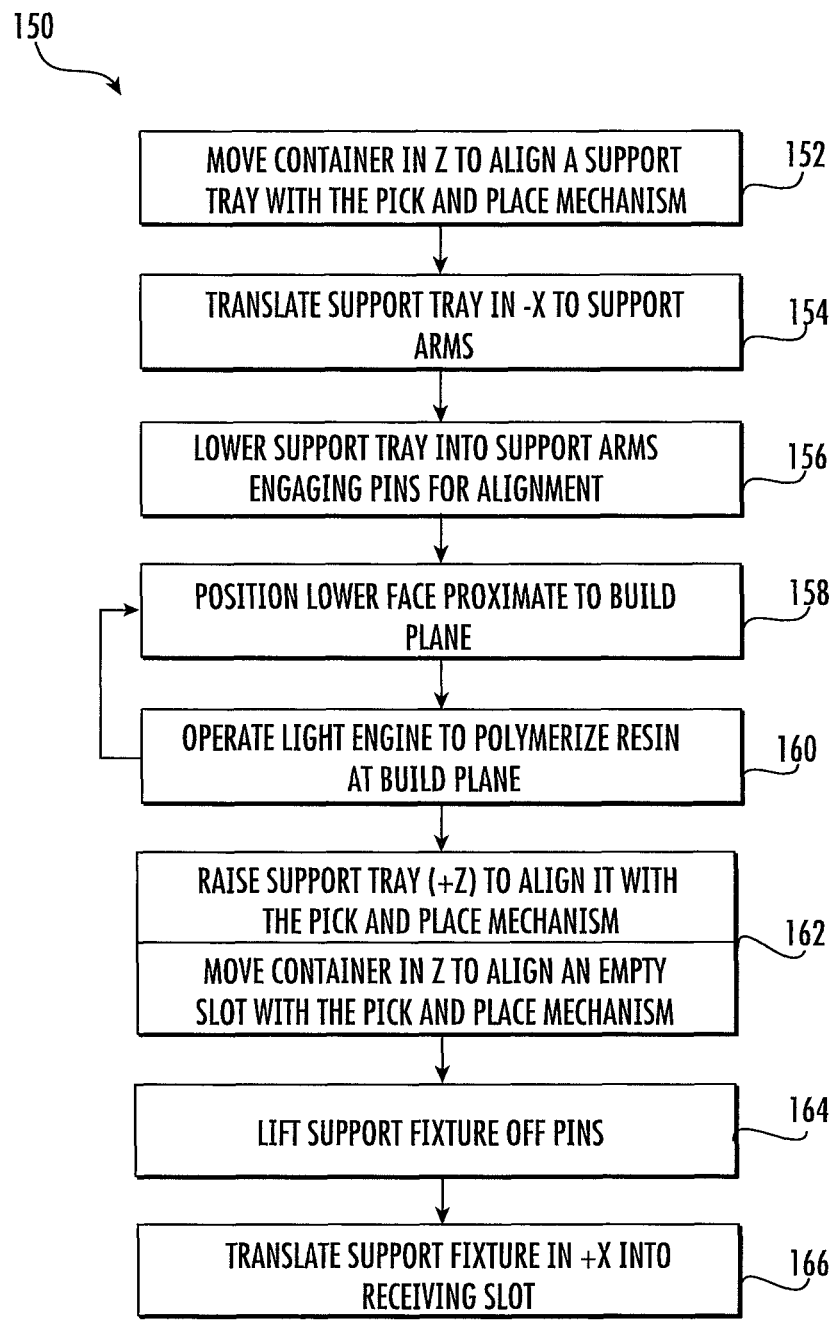
FIG. 11 is flowchart depicting a method for processing one build tray.

FIG. 11 is a flowchart depicting an exemplary method 150 of processing a single empty tray. Method 150 corresponds to steps 142 to 146 of FIG. 8, but provides some additional details. Method 150 is performed by controller 4 in operating on components of the three dimensional printing system 2.

According to step 152 the container movement mechanism 18 vertically positions container 16 whereby an empty support tray 14 is within a capture distance of the pick and place mechanism 10. Also according to step 152, the support arms 80 are within a capture distance of the pick and place mechanism 10.

According to step 154, the pick and place mechanism 10 translates the empty support tray 14 from the container 16 to the support arms 80. According to step 156, the pick and place mechanism 10 lowers and releases the support tray 14 onto the support arms 80. The support arms 80 then magnetically hold down the support tray 14.

According to step 158, the support movement mechanism 20 moves the lower face 89 of the support tray 14 proximate to the build plane 38. According to step 160, the light engine 22 selectively transmits pixelated light 36 to build plane 38 to form hardened resin onto lower face 89. The hardened resin now defines a lower face 34. Steps 158 and 160 are then repeated until a three dimensional article of manufacture 26 is fully formed onto the support tray 14.

According to step 162, the support movement mechanism moves the full support tray 14 into alignment (within a capture range) with the pick and place mechanism 10. Also according to step 162, the container movement mechanism moves an empty slot into alignment with (within capture range) of the pick and place mechanism 10.

According to step 164, the pick and place mechanism 10 lifts the full support tray off of the support arms 80. According to step 166, the pick and place mechanism 10 translates the full support tray 14 to the empty slot 100.

Figure 12:
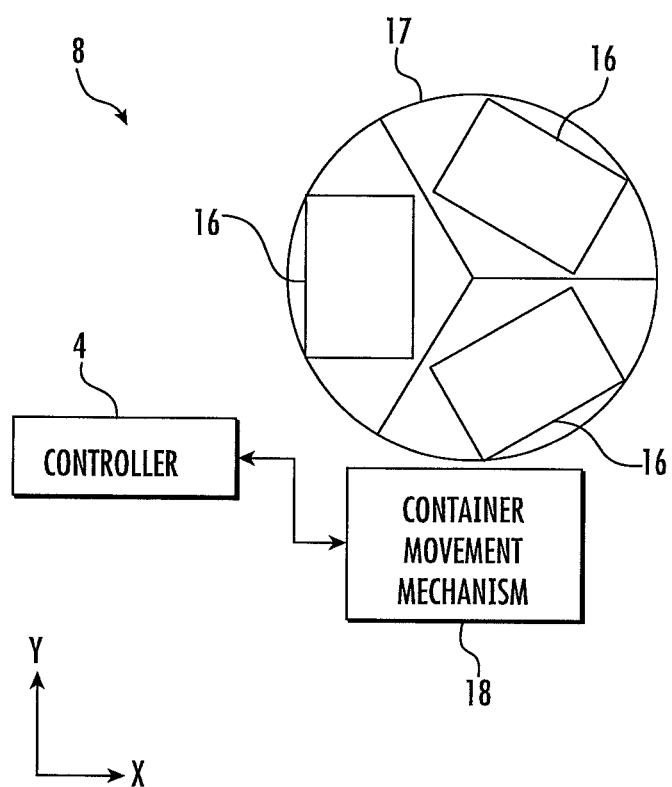
FIG. 12 is a schematic plan view of an alternative embodiment of a storage system.

FIG. 12 is a plan view schematic of an alternative of a storage system 8 for storing empty and full support trays 14. Storage system includes a carousel-type housing 17 supporting three containers 16. The containers 16 may be similar to the container 16 design discussed with respect to FIGS. 7, 9A-E, and 10A-B. This design has the advantage of tripling the capacity of one container 16.

The container movement mechanism 18 is configured to rotate carousel 17 about vertical axis Z and to translate the containers in Z under control of controller 4. In this way, a large number of three dimensional articles of manufacture 26 can be fabricated and stored.

In other embodiments, the carousel housing 17 can accommodate two, four, five, or other quantities of containers 16. In yet other embodiments the container 16 itself can be cylindrical with an overall lateral shape like carousel housing 17. The container can have two, three, four, or more sides with bays and/or slots for receiving and storing empty and full support trays 14. In yet other embodiments, the container 16 and/or housing 17 can have a polygonal shape with each side of the polygon for storing support trays 14.

Figure 13:
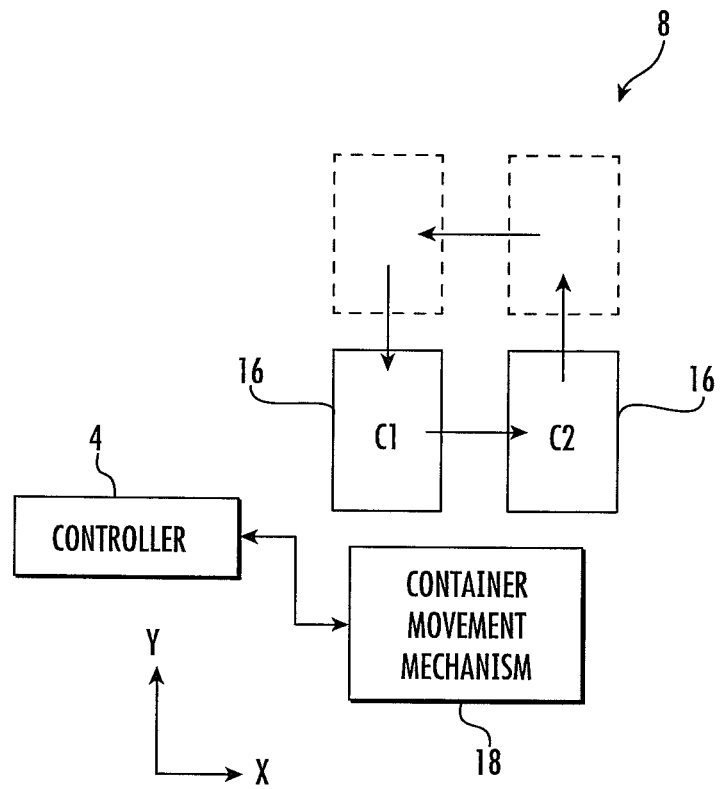
FIG. 13 is a schematic plan view of an alternative embodiment of a storage system.

FIG. 13 is a plan view schematic of another alternative storage system 8 for storing empty and full support trays 14. Storage system 8 includes two or three containers 16. Container movement mechanism 18 is configured to move the containers 16 along lateral linear paths of motion including +X, −X, +Y, and −Y.

A possible movement sequence is outlined in FIG. 13 including the following steps: (1) Container C1 is filled during operation with full support trays 14. (2) Empty container C2 is moved backward (+Y). (3) Full container C1 is moved to the right (+X) and can now be removed and replaced with container 16 having empty support trays 14. (4) Empty container C2 is moved to the left (−X). (5) Empty container C2 is moved forward (−Y) and is then in an operating position whereby the pick and place mechanism 10 can access it.

Figure 14:
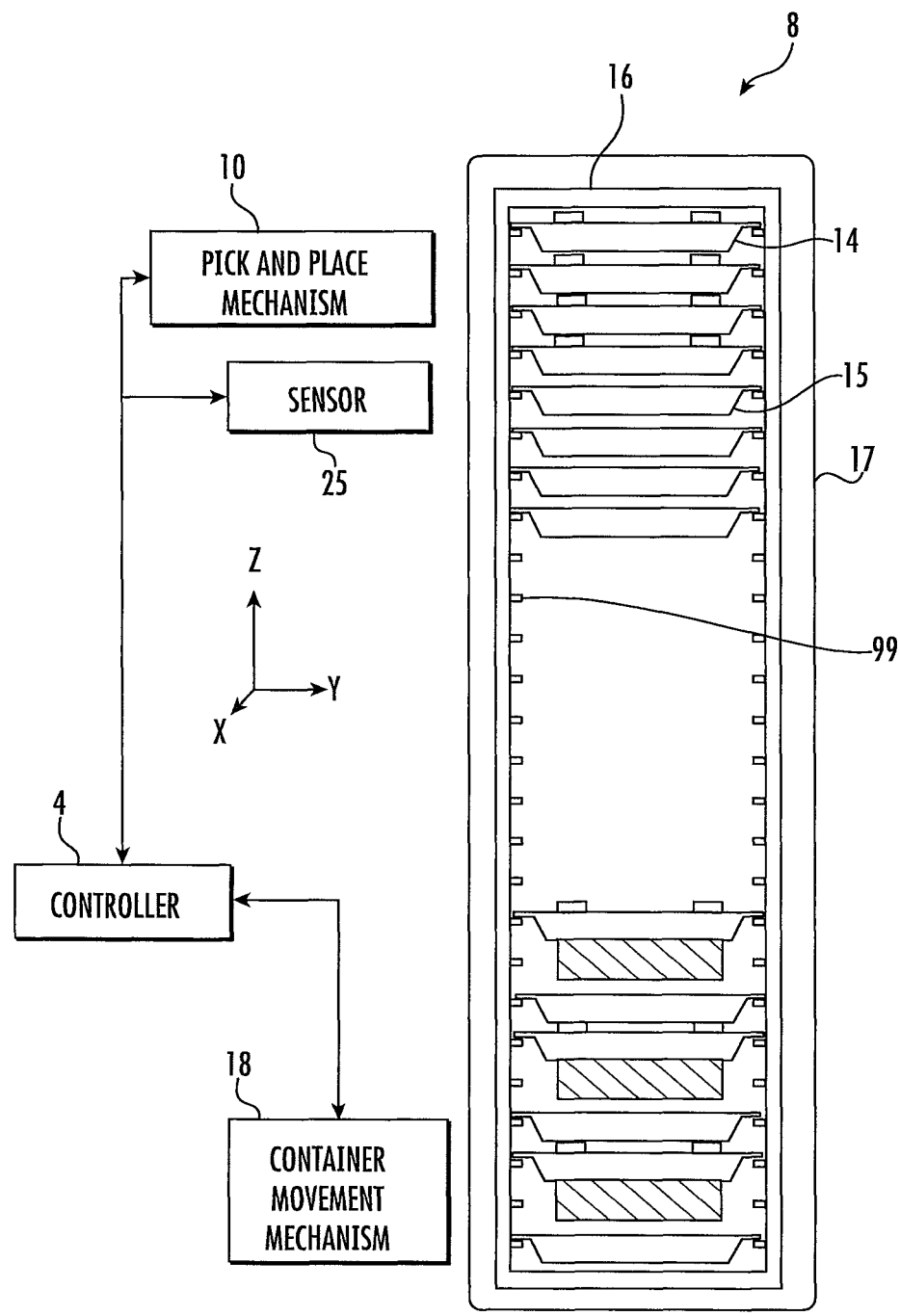
FIG. 14 is an illustration of an alternative storage system and the use of drip trays.

FIG. 14 is a schematic illustration of an alternative design for a container 16 and drip trays 15. Container 16 includes a plurality of inwardly extending tabs 99 for supporting empty or full support rays 14 and drip trays 15. For purposes of terminology, gaps 100 between the tabs 99 can be referred to as slots 100. Thus, the term "slots" refers to embodiments of FIG. 7 or FIG. 14.

In a preferred embodiment, each of the slots 100 or tabs 99 include a feature that prevents support trays (full or empty) or drip trays from accidentally sliding out from container 16. In one embodiment, the feature is a permanent magnet that holds a support tray 14 or drip tray 15 in place. The support trays 14 and drip trays 15 can both be formed from magnetic material. In other embodiments, the feature can be a pin that slides into datum feature 90 (which can be present also on the drip trays). In yet other embodiments the feature can be a metal spring that slidingly engages support trays 14 and drip trays 15 as they are installed in slots 100.

Before operation, the drip trays 15 are initially loaded into the container 16 just as for the support trays 14. During operation, the drip trays 15 are placed below the full support trays 14 to catch drips of uncured resin.

A sensor 25 enables the controller 4 to verify proper loading of containers 16 with support trays 14 and drip trays 15 and proper formation of three dimensional articles of manufacture 26 during a build process. Sensor 25 can also verify proper positioning of container(s) 16. Sensor 25 can include an emitter detector pair having a beam directed along axis X. The controller 4 can provide alerts and/or instructions to UI 5 as needed in response to missing or misplaced articles and/or portions of storage system 8. Sensor 25 can be utilized with any or all of the storage systems illustrated in FIGS. 1-3, 7, and 12-14.

Figure 15:
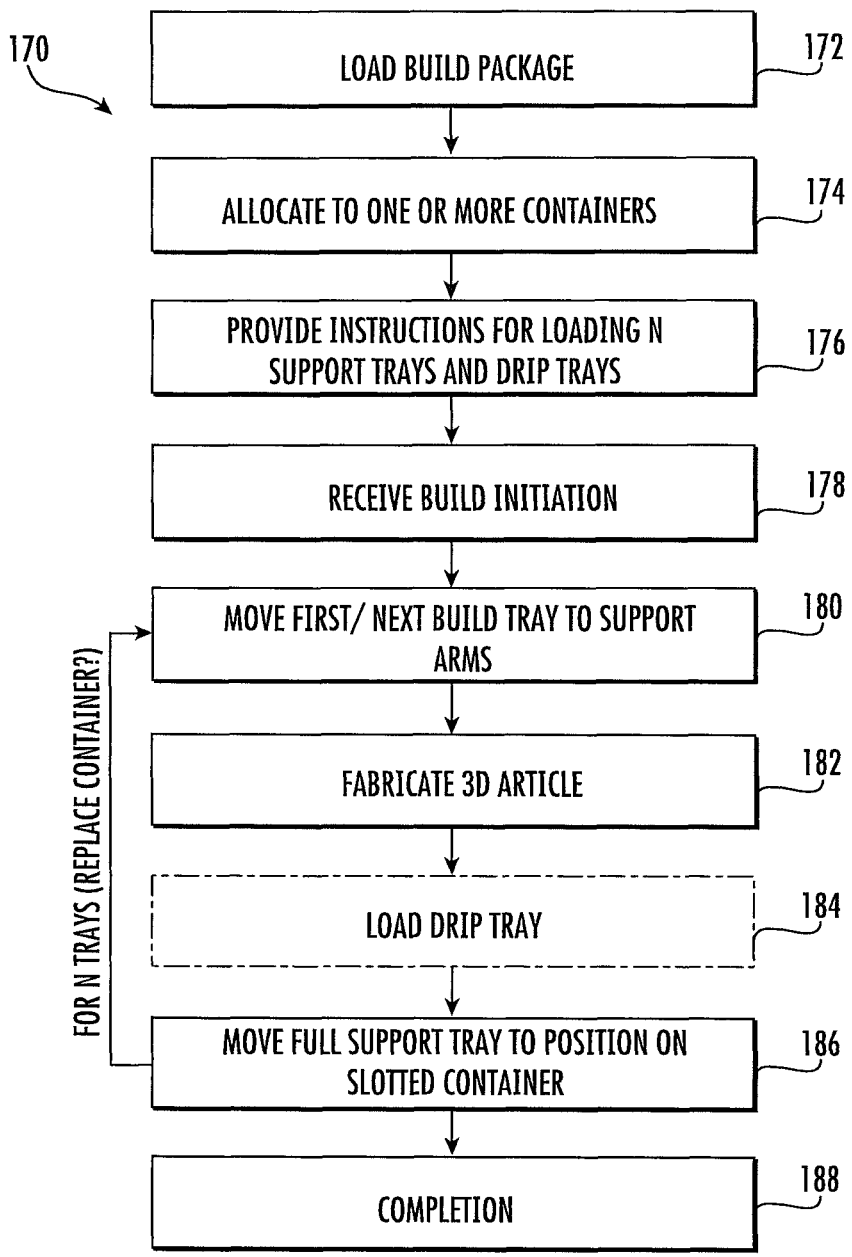
FIG. 15 is a flowchart of an alternative embodiment of a manufacturing process.

FIG. 15 is a flowchart depicting an alternative method 170 of manufacturing a plurality or three dimensional articles of manufacture 26 using the three dimensional printing system 2. This method 170 is performed under control of controller 4.

According to step 172, a build package (file or set of files) is loaded into the controller 4. The build package defines a "build plan" for the manufacture of the three dimensional articles of manufacture 26.

According to step 174 the controller determines anticipated positioning of empty support trays 14, drip trays 15, and full support trays 14. In some cases this may encompass multiple containers 16. Any of the previously described embodiments of storage systems 8 can be utilized.

According to step 176, the controller provides instructions to a UI 5 for loading N support trays and as many drip trays as are required. In one embodiment, the user loads the drip trays 15 below the partitions 101 to receive the full support trays 14. After the user has loaded the support trays 14 and drip trays 15, the controller receives an input from the UI to start the build process.

According to step 180, an empty support tray is loaded from the storage system 8 to the support arms 80. According to step 182 a three dimensional article of manufacture 26 is formed onto a lower face 89 of support tray 14. According to step 184, a drip tray 15 is loaded below an allocated partition 101 to receive the full support tray 14. This step 184 is shown as dashed (optional) as it is not necessary if a user has already loaded a drip tray below the partition 101. According to step 186, the full support tray 14 is moved to its partition 101 above the drip tray 15. As indicated in FIG. 15, steps 180-186 are executed N times for the N three dimensional articles of manufacture 26 to be fabricated. During these N times, an optional step would be a replacement of a full container 16 with an empty container.

According to step 188, the process is complete. As part of the method 170, the controller can use sensor 25 to verify any or all of step 176 (trays loaded properly), step 180 (proper loading), step 182 (proper fabrication), step 184, and step 186.

The specific embodiments and applications thereof described above are for illustrative purposes only and do not preclude modifications and variations encompassed by the scope of the following claims.

What is claimed:

1. A three dimensional printing system comprising:
   a print engine including:
   a resin vessel having a lower side with a transparent sheet;
   a light engine that defines a build plane above the transparent sheet; and
   a carriage having support arms for supporting a support tray; and
   a storage system;
   a pick and place mechanism; and
   a controller configured to:
   1) receive a build order defining a plurality of three dimensional articles to be fabricated;
   2) allocate partitions within the storage system for receiving the plurality of three dimensional articles;
   3) operate the pick and place mechanism to retrieve an empty support tray from the storage system and to place the support tray onto the support arms;
   4) operate the print engine to fabricate a three dimensional article of the plurality of three dimensional articles onto the support tray;
   5) operate the pick and place mechanism to transfer the support tray with the three dimensional article to one of the allocated partitions; and
   6) repeat steps 3 to 5 to complete the build order, the allocated partitions store the plurality of three dimensional articles, and
   wherein the storage system includes:
   a container with a vertical arrangement of slots or tabs; and
   a movement mechanism for vertically positioning the container.

2. The three dimensional printing system of claim 1 wherein the controller is further configured to provide instructions to a user indicating a specified quantity of empty support trays to be loaded into the storage system after step 2.

3. The three dimensional printing system of claim 1 wherein the controller is further configured to vertically position the support arms to within a vertical capture distance of the pick and place mechanism before performing step 3.

4. The three dimensional printing system of claim 1 wherein the controller is further configured to operate the movement mechanism to vertically position a slot or tab containing an empty support tray to within a vertical capture distance of the pick and place mechanism before performing step 3.

5. The three dimensional printing system of claim 1 wherein allocating partitions includes allocating a vertical arrangement of the partitions that each contain one or more of the slots or tabs.

6. The three dimensional printing system of claim 1 wherein the controller is further configured to operate the movement mechanism to vertically position a slot or tab within an empty allocated partition to within a capture distance of the pick and place mechanism before performing step 5.

7. The three dimensional printing system of claim 1 wherein some of the allocated partitions initially contain empty support trays before step 3.

8. The three dimensional printing system of claim 1 wherein step 4 includes:
   a) move the support arms until a lower face of the support tray or hardened resin is proximate to the build plane;
   b) operate the light engine to selectively cure resin onto the lower face;
   c) repeat a) and b) until the three dimensional article is fabricated; and
   d) raise the support arms to within a capture distance of the pick and place mechanism before performing step 5.

9. A three dimensional printing system comprising:
   a print engine including:
   a resin vessel having a lower side with a transparent sheet;
   a light engine that defines a build plane above the transparent sheet; and a carriage having support arms for supporting a support tray; and
a storage system;
a pick and place mechanism; and
a controller configured to:
1) receive a build order defining a plurality of three dimensional articles to be fabricated;
2) allocate partitions for receiving the plurality of the three dimensional articles within the storage system;
3) generate a prompt for a user to load a specified number of support trays into the storage system;
4) receive an input from the user to start operation;
5) operate the pick and place mechanism to retrieve an empty support tray from the storage system and to place the support tray onto the support arms;
6) operate the print engine to fabricate a three dimensional article of the plurality of three dimensional articles onto the support tray;
7) operate the pick and place mechanism to transfer the support tray with the three dimensional article to one of the allocated partitions; and
8) repeat steps 3 to 5 to complete the build order whereby the allocated partitions store the plurality of three dimensional articles, and
wherein the storage system includes:
a container with a vertical arrangement of slots or tabs; and
a movement mechanism for vertically positioning the container.

10. The three dimensional printing system of claim 9 wherein allocating partitions includes allocating a vertical arrangement of the partitions that each contain one or more of the slots or tabs.

11. The three dimensional printing system of claim 10 wherein the user is instructed to load the empty support trays into a vertical range of the slots or tabs in step 3).

12. The three dimensional printing system of claim 11 wherein the range of slots or tabs receiving the empty trays overlaps at least partially with the allocated vertical arrangement of partitions.

13. A three dimensional printing system comprising:
a print engine including:
a resin vessel having a lower side with a transparent sheet;
a light engine that defines a build plane above the transparent sheet;
carriage having support arms for supporting a support tray; and
a support movement mechanism coupled to the carriage; and
a storage system including:
a container with a vertical arrangement of slots or tabs; and
a container movement mechanism for vertically positioning the container; and
a pick and place mechanism; and
a controller configured to:
1) receive a build order defining a plurality of three dimensional articles to be fabricated;
2) vertically allocate partitions of the container for the three dimensional articles;
3) vertically position the support arms and a slot or tab holding an empty support tray to within a vertical capture distance of the pick and place mechanism;
4) operate the pick and place mechanism to transfer the empty support tray from the slot or tab to the support arms;
5) operate the print engine to fabricate one a three dimensional article of the three dimensional articles onto the support tray;
6) vertically position the support arms and an empty one of the partitions to within a vertical capture distance of the pick and place mechanism;
7) operate the pick and place mechanism to transfer the support tray with the fabricated three dimensional article from the support arms to the empty partition; and
8) repeat steps 3-7 to complete the build order.

14. The three dimensional printing system of claim 13 wherein the controller is configured to prompt a user to load empty support trays into a range of the slots or tabs before step 3.

15. The three dimensional printing system of claim 14 wherein the range of slots or tabs receiving the empty support trays vertically overlaps with the allocated partitions.

* * * * *